US012602982B2

(12) United States Patent
Kann et al.

(10) Patent No.: US 12,602,982 B2
(45) Date of Patent: *Apr. 14, 2026

---

(54) NETWORK EDGE DETECTION AND NOTIFICATION OF GAS PRESSURE SITUATION

(71) Applicant: Itron, Inc., Liberty Lake, WA (US)

(72) Inventors: James Lee Kann, Mica, WA (US); Katrina Polk, Ponte Vedra, FL (US); Janet Penz, Lakeview, MN (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,648

(22) Filed: Apr. 12, 2024

(65) Prior Publication Data

US 2024/0257626 A1     Aug. 1, 2024

Related U.S. Application Data

(63) Continuation of application No. 17/939,856, filed on Sep. 7, 2022, now Pat. No. 12,002,342, which is a
(Continued)

(51) Int. Cl.
| | |
|---|---|
| *G08B 21/16* | (2006.01) |
| *G01M 3/22* | (2006.01) |
| *G08B 27/00* | (2006.01) |

(52) U.S. Cl.
CPC ............. *G08B 21/16* (2013.01); *G01M 3/224* (2013.01); *G08B 27/005* (2013.01); *G08B 27/006* (2013.01)

(58) Field of Classification Search
CPC ... G01F 1/48; H01L 21/67017; D06F 39/081; E03B 7/071; G01M 3/22; G08B 21/16; F16K 37/0091; Y10T 137/0452
See application file for complete search history.

(56) References Cited

U.S. PATENT DOCUMENTS

| | | |
|---|---|---|
| 2,302,284 A | 11/1942 | Abbott |
| 5,878,779 A | 3/1999 | Bircann et al. |
| | | (Continued) |

FOREIGN PATENT DOCUMENTS

| | | |
|---|---|---|
| CN | 10431452 | 10/2017 |
| EP | 1062645 | 11/2002 |
| | | (Continued) |

OTHER PUBLICATIONS

"Automated Flushing Gives Water Savings," Elsevier Ltd., Nov. 6, 2019, at <https://www.filtsep.com/water-and-wastewater/features/automated-flushing-gives-water-savings/>, 3 pages.
(Continued)

*Primary Examiner* — Mirza F Alam
(74) *Attorney, Agent, or Firm* — Lee & Hayes, P.C.

(57) ABSTRACT

Techniques for detecting a high gas pressure situation within a gas delivery system (e.g., for natural gas delivery to homes and businesses) are described. In one example, a device measures gas pressure. If a pressure over a threshold value is detected, a nearby device is messaged. The nearby device either confirms the over-pressure condition or indicates it may be more localized. If the condition is present within an area of the gas delivery system and/or within a group of devices within the gas delivery system, protective measures may be taken, such as closing valves providing gas to a number of service sites.

20 Claims, 7 Drawing Sheets

Related U.S. Application Data continuation of application No. 17/127,896, filed on Dec. 18, 2020, now Pat. No. 11,594,117.

(56) References Cited

U.S. PATENT DOCUMENTS

| | | | |
|---|---|---|---|
| 7,458,387 B2 | 12/2008 | McGill | |
| 7,759,948 B2 | 7/2010 | Tischendorf et al. | |
| 7,980,136 B2 | 7/2011 | Ben-Mansour | |
| 8,054,199 B2 | 11/2011 | Addy | |
| 8,485,213 B2 | 7/2013 | Hawkins et al. | |
| 9,182,052 B2 | 11/2015 | Scott et al. | |
| 9,928,720 B2 | 3/2018 | Cornwall | |
| 9,939,341 B2 | 4/2018 | McNab et al. | |
| 10,704,946 B2 | 7/2020 | Seehoffer | |
| 10,948,131 B1 | 3/2021 | Francis | |
| 11,047,496 B1* | 6/2021 | McConnell | G01M 3/2815 |
| 11,473,933 B2 | 10/2022 | Heizenroeder | |
| 2004/0187930 A1 | 9/2004 | Hawkins et al. | |
| 2006/0248032 A1 | 11/2006 | Jellum et al. | |
| 2008/0270045 A1 | 10/2008 | Miyata et al. | |
| 2009/0018782 A1 | 1/2009 | Sameda et al. | |
| 2009/0198384 A1 | 8/2009 | Ahn | |
| 2009/0240445 A1 | 9/2009 | Umekage et al. | |
| 2010/0017150 A1 | 1/2010 | Itou | |
| 2010/0156632 A1 | 6/2010 | Hyland et al. | |
| 2010/0188261 A1 | 7/2010 | Fujii et al. | |
| 2010/0219933 A1 | 9/2010 | Ueki et al. | |
| 2010/0229653 A1 | 9/2010 | Tabellario | |
| 2010/0269596 A1 | 10/2010 | Miyata et al. | |
| 2011/0254696 A1 | 10/2011 | Cornwall et al. | |
| 2011/0288793 A1 | 11/2011 | Sanchez-Loureda et al. | |
| 2011/0313964 A1 | 12/2011 | Sanchey Loureda et al. | |
| 2012/0022812 A1 | 1/2012 | Longtin | |
| 2012/0111799 A1 | 5/2012 | Lemoine et al. | |
| 2012/0112901 A1 | 5/2012 | Chasko | |
| 2012/0136593 A1 | 5/2012 | Donaldson et al. | |
| 2012/0173252 A1 | 7/2012 | Mak et al. | |
| 2012/0174655 A1 | 7/2012 | Essich | |
| 2013/0035884 A1 | 2/2013 | Burke et al. | |
| 2013/0096857 A1 | 4/2013 | Chakradhar | |
| 2013/0110621 A1 | 5/2013 | Gupta et al. | |
| 2013/0204399 A1 | 8/2013 | Donaldson et al. | |
| 2013/0262197 A1 | 10/2013 | Kaulgud et al. | |
| 2014/0130878 A1 | 5/2014 | Marinez | |
| 2014/0207392 A1 | 7/2014 | Cornwall | |
| 2014/0231531 A1* | 8/2014 | van der Donk | F23N 5/242 237/12 |
| 2016/0001114 A1 | 1/2016 | Hyland et al. | |
| 2016/0327603 A1 | 11/2016 | Sonderegger et al. | |
| 2016/0334029 A1 | 11/2016 | French | |
| 2017/0193790 A1* | 7/2017 | Cornwall | G01D 21/00 |
| 2018/0052023 A1 | 2/2018 | Yokohata et al. | |
| 2019/0025150 A1 | 1/2019 | Picardi et al. | |
| 2019/0234786 A1 | 8/2019 | Klicpera | |
| 2019/0242741 A1 | 8/2019 | Idris et al. | |
| 2019/0289077 A1 | 9/2019 | Sacchetti | |
| 2019/0323918 A1 | 10/2019 | Sahoo | |
| 2020/0003606 A1 | 1/2020 | Yu | |
| 2020/0124195 A1* | 4/2020 | Monk | G01M 3/04 |
| 2020/0132219 A1 | 4/2020 | Thompson et al. | |
| 2020/0173810 A1 | 6/2020 | Verma et al. | |
| 2020/0386732 A1* | 12/2020 | Park | G01N 1/34 |
| 2021/0190568 A1 | 6/2021 | Haag et al. | |
| 2021/0392604 A1 | 12/2021 | Deshmukh | |
| 2022/0128428 A1 | 4/2022 | Clark | |
| 2022/0170773 A1 | 6/2022 | Lampe-Juergens et al. | |
| 2022/0196183 A1 | 6/2022 | Kann et al. | |
| 2022/0196448 A1 | 6/2022 | Cornwall et al. | |
| 2022/0196451 A1 | 6/2022 | Cornwall et al. | |
| 2022/0196454 A1 | 6/2022 | Cornwall | |
| 2022/0198904 A1 | 6/2022 | Kann et al. | |
| 2022/0201082 A1 | 6/2022 | Cornwall et al. | |
| 2022/0412787 A1 | 12/2022 | Kann | |
| 2023/0005353 A1 | 1/2023 | Kann | |
| 2023/0224367 A1 | 7/2023 | Cornwall | |
| 2023/0273053 A1 | 8/2023 | Ukn | |
| 2024/0257626 A1 | 8/2024 | Kann et al. | |

FOREIGN PATENT DOCUMENTS

| | | |
|---|---|---|
| EP | 1062645 B1 | 11/2002 |
| EP | 2477088 | 7/2012 |
| WO | WO2009075082 | 6/2009 |
| WO | WO201011169 | 9/2010 |
| WO | WO201106827 A1 | 6/2011 |
| WO | WO201106827 | 8/2012 |
| WO | WO201210670 | 8/2012 |
| WO | WO201215675 | 11/2012 |
| WO | WO201617087 A1 | 2/2016 |
| WO | WO201706199 A1 | 1/2017 |
| WO | WO201820923 A1 | 2/2018 |
| WO | WO2018020923 | 11/2018 |

OTHER PUBLICATIONS

"Backflow Prevention—What does it Mean to You?", American Backflow Prevention Association, found at <https://www.abpa.org/page/BackflowPrevention#>, date unknown, printed on Jan. 8, 2021, 2 pages.

"How Much Does an Industrial Water Treatment System Cost?", found at <https://www.samcotech.com/how-much-does-an-industrial-water-treatment-system-cost/>, SAMCO, dated Sep. 22, 2017, 4 pages.

"Potential Contamination Due to Cross-Connections and Backflow and the Associated Health Risks," U.S. Environmental Protection Agency Office of Ground Water and Drinking Water Standards and Risk Management Division, Washington DC, Sep. 27, 2001, 44 pages.

"Remotely Control and Automatically Optimise Pressure in Your Entire Network," oNet, i20 Solutions, dated Feb. 20, 2018, 2 pages.

"Energy Systems, Electricity, and Fire Safety," Course AP 312, University School of Planning and Architecture, Guru Gobind Singh Indraprastha University, Delhi, IN, published Jun. 13, 2015, found at <https://www.slideshare.net/supergirlanchal/energy-systems-electricity-and-fire-safety>, 41 pages.

Anwar, F., et al., "Network-Based Real-time Integrated Fire Detection and Alarm (FDA) System with Building Automation," 6th Intl. Conf. on Mechatronics, ICOM'17, IOP Conf. Series: Materials Science & Engineering, vol. 260, No. 012025, Aug. 8-9, 2017, Kuala Lumpur, Malaysia, at <http://iopscience.iop.org/article/10.1088/1757-899X/260/1/012025/meta>, 16 pages.

Artim, N., Emergency Management, "3.2 An Introduction to Fire Detection, Alarm, & Automatic Fire Sprinklers," Northeast Document Conservation Center, Nov. 28, 2018, at <https://www.nedcc.org/free-resources/preservation-leaflets/3.-emergency-management/3.2-an-introduction-to-fire-detection,-alarm,-and-automatic-fire-sprinklers>, 26 pages.

International Preliminary Report on Patentability for PCT Application No. PCT/US21/53001, mailed Feb. 8, 2022.

International Preliminary Report on Patentability for PCT Application No. PCT/US21/53007, mailed Feb. 3, 2022.

PCT Search Report and Written Opinion mailed on Feb. 8, 2024 for PCT Application No. PCT/US2023/024617 from PCT Summary, 24 pages.

PCT Search Report mailed Mar. 28, 2018 for PCT application No. PCT/US2017/067827, 19 pages.

Dreher, A., et al., "E. coli Found in Some Contaminated Hillyard Water This Weekend," The Spokesman-Review, Spokane, Washington, Jul. 31, 2019, at <https://www.spokesman.com/stories/2019/jul31/e-coli-found-in-some-contaminated-hillyard-water-t/>, 6 pages.

Fontanazza, C., et al., "Contaminant intrusion through leaks in water distribution system: experimental analysis," Procedia Engineering, vol. 19 (2015), 13th Computer Control for Water Industry Conference, CCWI 2015, Sep. 2-4, 2015, Leicester, UK, pp. 426-433.

(56) References Cited

OTHER PUBLICATIONS

Henderson, et al., "Disaggregating Hot Water Use and Predicting Hot Water Waste in Five Test Homes", U.S Department of Energy, 2014.

Hopf, Dr. S., "Application Models for the Power Distribution: High-rise Buildings", copyright 2012, Siemens Aktiengesellschaft, Berlin and Munich, Germany, found at <https://www.siemens.com/content/dam/webassetpool/mam/tag-siemens-com/smdb/energy-management/services-power-transmission-power-distribution-smart-grid/consulting/tip-planungshandb%C3%BCcher/application-model-for-high-rise-buildings.pdf>, printed from Internet on Nov. 28, 2018, 96 pages.

Kapis, J., et al., "Integration: Building Automation and Fire Alarms," Insights, Schneider Electric US, date unknown, found online at <https://www.schneider-electric.us/en/work/insights/integration-building-automation-and-fire-alarms.jsp>, obtained from Internet on Nov. 28, 2018, 9 pages.

Manual of Design and Specification Standards, Div 16—Electrical, Section 16720—Fire Alarm Systems, University of Arizona, Mar. 2004, found at <https://pdc.arizona.edu/dssarchive/rev4/16720.pdf>, obtained from the Internet on Nov. 28, 2018, 3 pages.

Mar, et al., "Integrating BAS, Electrical Systems," Insights, Schneider Electric UK, date unknown, found online at <https://www.schneider-electric.co.uk/en/work/insights/integrating-bas-electrical-systems.jsp>, obtained from Internet on Nov. 28, 2018, 9 pages.

Non-Final Office Action dated Jan. 29, 2020, for U.S. Appl. No. 16/206,121, 12 pages.

Office action for U.S. Appl. No. 13/747,295, mailed on Jan. 19, 2017, Cornwall, "System to Identify Gas Usage by Appliance", 24 pages.

Office action for U.S. Appl. No. 13/747,295, mailed on Mar. 4, 2016, Cornwall, "System to Identify Gas Usage by Appliance", 12 pages.

Office action for U.S. Appl. No. 13/747,295, mailed on Nov. 18, 2015, Cornwall, "System to Identify Gas Usage by Appliance", 14 pages.

Office Action for U.S. Appl. No. 16/454,625, mailed on Feb. 23, 2021, Sahoo, "Measuring Contamination to Determine Leak Location", 10 Pages.

Office Action for U.S. Appl. No. 17/127,678, mailed Jul. 20, 2022, Cornwall, "Disaggregation of Gas Load to Determine Gas Appliance Performance", 21 pages.

Office Action for U.S. Appl. No. 17/127,678, mailed on May 24, 2022, Cornwall, "Disaggregation of Gas Load to Determine Gas Appliance Performance", 21 Pages.

Office action for U.S. Appl. No. 17/127,713, mailed on Nov. 25, 2022, Cornwall et al., "Disaggregation of Gas Load to Determine Meter or Service Under-Sizing", 26 pages.

Office Action for U.S. Appl. No. 17/127,841, mailed on Sep. 14, 2023, Kann, "Gas Regulator Diaphragm-Position and Pressure-Relief Detection" 14 pages.

Office Action for U.S. Appl. No. 17/127,841, mailed on Sep. 19, 2022, Kann, "Gas Regulator Diaphragm-Position and Pressure-Relief Detection", 12 pages.

Office Action for U.S. Appl. No. 17/127,880, mailed on Aug. 8, 2023, Mark K. Cornwall, "Gas Regulator Pressure-Relief Monitor", 13 pages.

Office Action for U.S. Appl. No. 17/127,896, mailed on Oct. 7, 2021, Kann, "Network Edge Detection and Notification of Gas Pressure Situation", 21 Pages.

Office Action for U.S. Appl. No. 17/939,856, mailed on Jan. 25, 2023, Kann, "Network Edge Detection and Notification of Gas Pressure Situation", 23 pages.

Office Action for U.S. Appl. No. 17/939,856, mailed on Jun. 12, 2023, James Lee Kann, "Network Edge Detection and Notification of Gas Pressure Situation", 24 pages.

Office Action for U.S. Appl. No. 18/114,780, mailed on Aug. 8, 2023, Mark K. Cornwall, "Disaggregation of Gas Load to Determine Gas Appliance Performance", 20 pages.

Office Action for U.S. Appl. No. 18/195,202, mailed on Dec. 26, 2023, Mark K. Cornwall, "Disaggregation of Gas Load to Determine Meter or Service Under-Sizing", 7 pages.

PCT International Search Report and Written Opinion dated Feb. 19, 2020, for PCT Application No. PCT/US2019/063002, 14 pages.

PCT Search Report and Written Opinion mailed Apr. 8, 2014 for PCT Application No. PCT/US13/68213, 9 Pages.

Segura, "Use of hydroinformatics technologies for real time water quality management and operation of distribution networks. Case sutdy of Villavicencio, Colombia", Mar. 1, 2006, Delft, Netherlands, retrieved from the internet at URL:https://www.un-ihe.org/sites/default/files/leonardo_alfonso_msc.pdf on Mar. 20, 2018.

White, R., "Liberty Lake Water Contamination Will Likely Require a Week of Boiling Drinking Water," The Spokesman-Review, Spokane, Washington, Nov. 22, 2019, at <https://www.spokesman.com/stories/2019/nov/21/liberty-lake-water-contamination-will-likely-requi/>, 3 pages.

Office Action for Canadian Application No. 3,193,725, Dated Aug. 2, 2024, 5 pages.

* cited by examiner

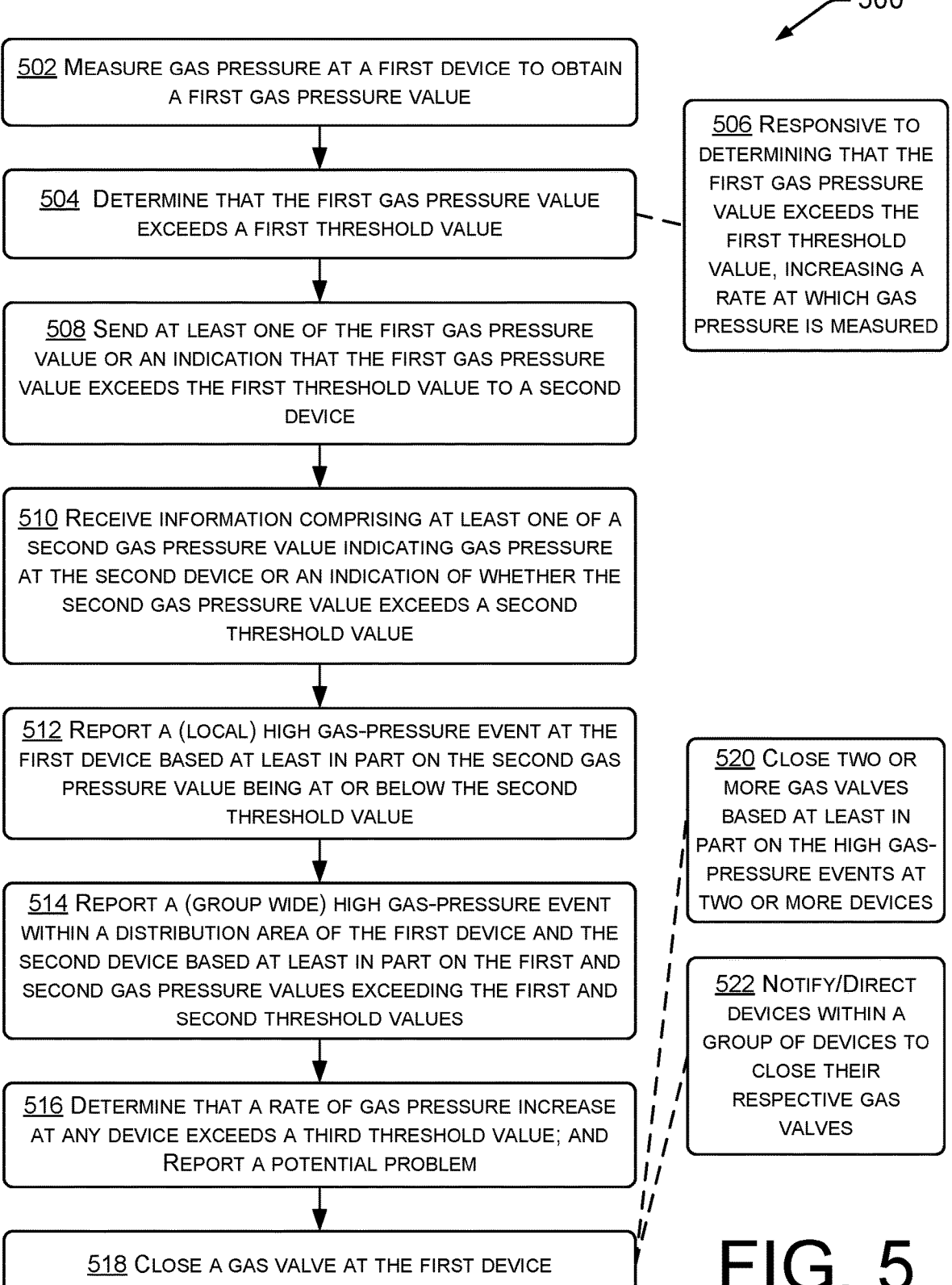

500

502 MEASURE GAS PRESSURE AT A FIRST DEVICE TO OBTAIN A FIRST GAS PRESSURE VALUE

504 DETERMINE THAT THE FIRST GAS PRESSURE VALUE EXCEEDS A FIRST THRESHOLD VALUE

506 RESPONSIVE TO DETERMINING THAT THE FIRST GAS PRESSURE VALUE EXCEEDS THE FIRST THRESHOLD VALUE, INCREASING A RATE AT WHICH GAS PRESSURE IS MEASURED

508 SEND AT LEAST ONE OF THE FIRST GAS PRESSURE VALUE OR AN INDICATION THAT THE FIRST GAS PRESSURE VALUE EXCEEDS THE FIRST THRESHOLD VALUE TO A SECOND DEVICE

510 RECEIVE INFORMATION COMPRISING AT LEAST ONE OF A SECOND GAS PRESSURE VALUE INDICATING GAS PRESSURE AT THE SECOND DEVICE OR AN INDICATION OF WHETHER THE SECOND GAS PRESSURE VALUE EXCEEDS A SECOND THRESHOLD VALUE

512 REPORT A (LOCAL) HIGH GAS-PRESSURE EVENT AT THE FIRST DEVICE BASED AT LEAST IN PART ON THE SECOND GAS PRESSURE VALUE BEING AT OR BELOW THE SECOND THRESHOLD VALUE

520 CLOSE TWO OR MORE GAS VALVES BASED AT LEAST IN PART ON THE HIGH GAS-PRESSURE EVENTS AT TWO OR MORE DEVICES

514 REPORT A (GROUP WIDE) HIGH GAS-PRESSURE EVENT WITHIN A DISTRIBUTION AREA OF THE FIRST DEVICE AND THE SECOND DEVICE BASED AT LEAST IN PART ON THE FIRST AND SECOND GAS PRESSURE VALUES EXCEEDING THE FIRST AND SECOND THRESHOLD VALUES

522 NOTIFY/DIRECT DEVICES WITHIN A GROUP OF DEVICES TO CLOSE THEIR RESPECTIVE GAS VALVES

516 DETERMINE THAT A RATE OF GAS PRESSURE INCREASE AT ANY DEVICE EXCEEDS A THIRD THRESHOLD VALUE; AND REPORT A POTENTIAL PROBLEM

518 CLOSE A GAS VALVE AT THE FIRST DEVICE

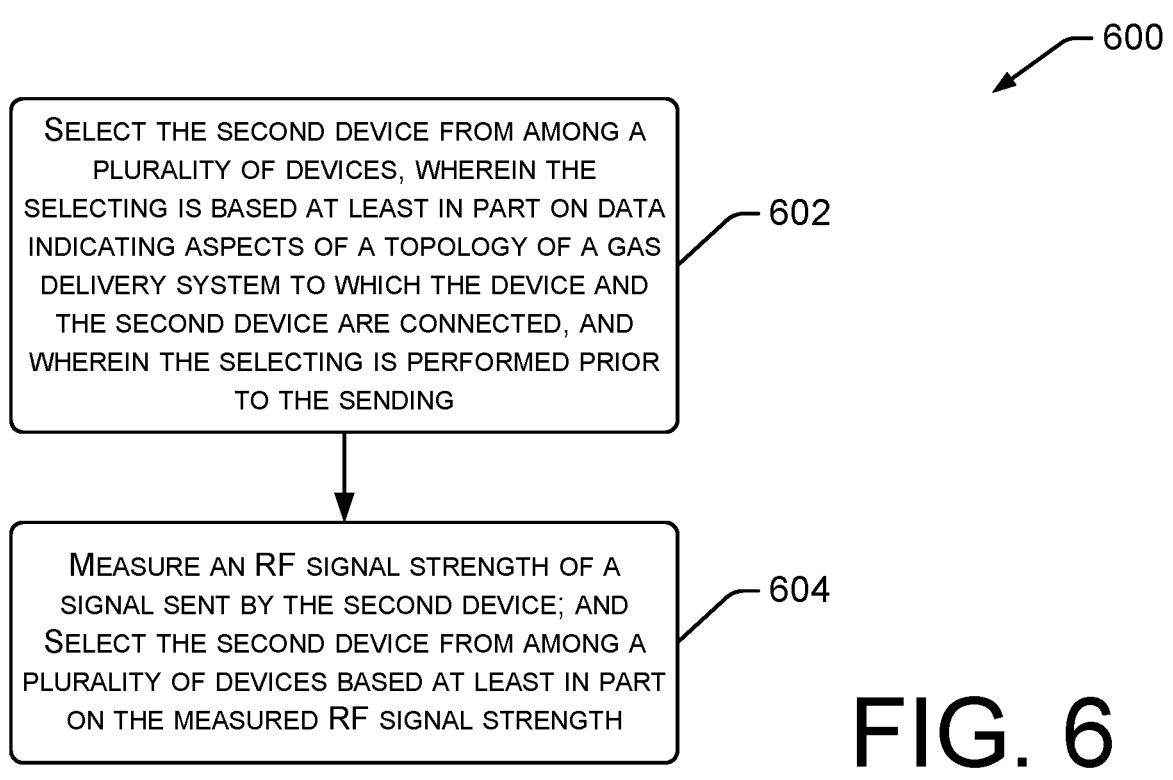

SELECT THE SECOND DEVICE FROM AMONG A PLURALITY OF DEVICES, WHEREIN THE SELECTING IS BASED AT LEAST IN PART ON DATA INDICATING ASPECTS OF A TOPOLOGY OF A GAS DELIVERY SYSTEM TO WHICH THE DEVICE AND THE SECOND DEVICE ARE CONNECTED, AND WHEREIN THE SELECTING IS PERFORMED PRIOR TO THE SENDING — 602

MEASURE AN RF SIGNAL STRENGTH OF A SIGNAL SENT BY THE SECOND DEVICE; AND SELECT THE SECOND DEVICE FROM AMONG A PLURALITY OF DEVICES BASED AT LEAST IN PART ON THE MEASURED RF SIGNAL STRENGTH — 604

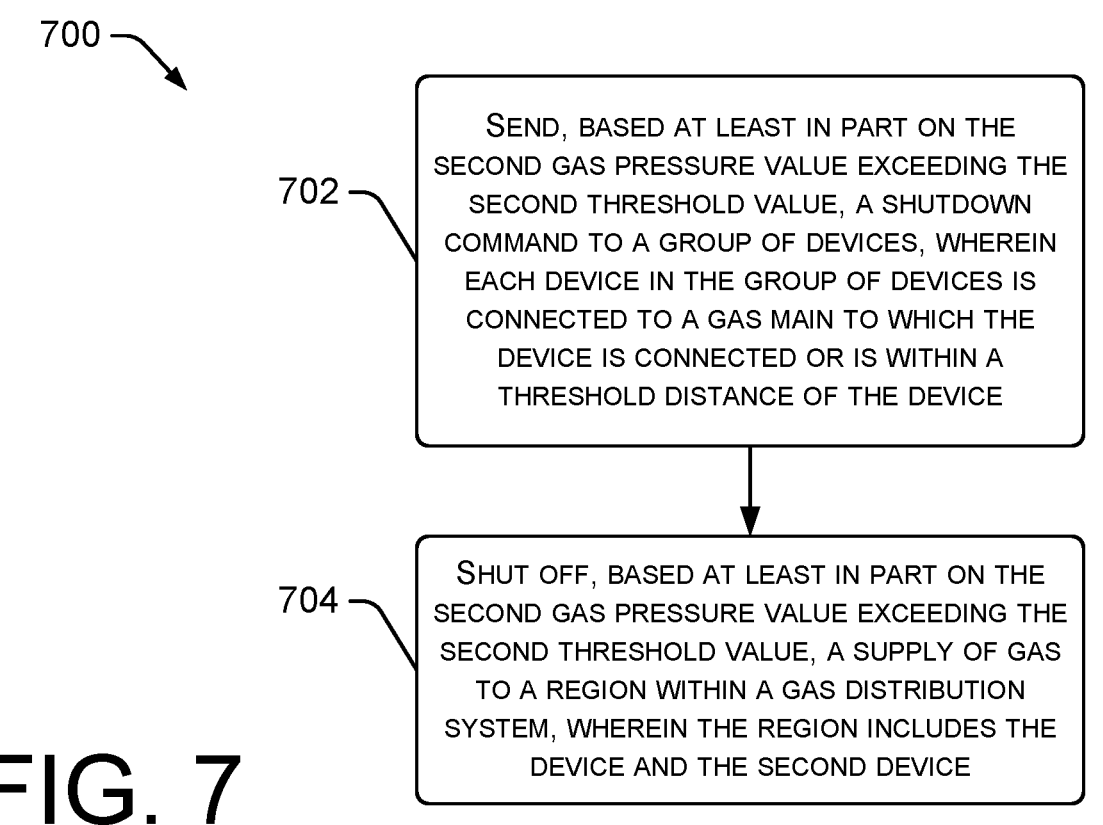

SEND, BASED AT LEAST IN PART ON THE SECOND GAS PRESSURE VALUE EXCEEDING THE SECOND THRESHOLD VALUE, A SHUTDOWN COMMAND TO A GROUP OF DEVICES, WHEREIN EACH DEVICE IN THE GROUP OF DEVICES IS CONNECTED TO A GAS MAIN TO WHICH THE DEVICE IS CONNECTED OR IS WITHIN A THRESHOLD DISTANCE OF THE DEVICE — 702

SHUT OFF, BASED AT LEAST IN PART ON THE SECOND GAS PRESSURE VALUE EXCEEDING THE SECOND THRESHOLD VALUE, A SUPPLY OF GAS TO A REGION WITHIN A GAS DISTRIBUTION SYSTEM, WHEREIN THE REGION INCLUDES THE DEVICE AND THE SECOND DEVICE — 704

FIG. 7

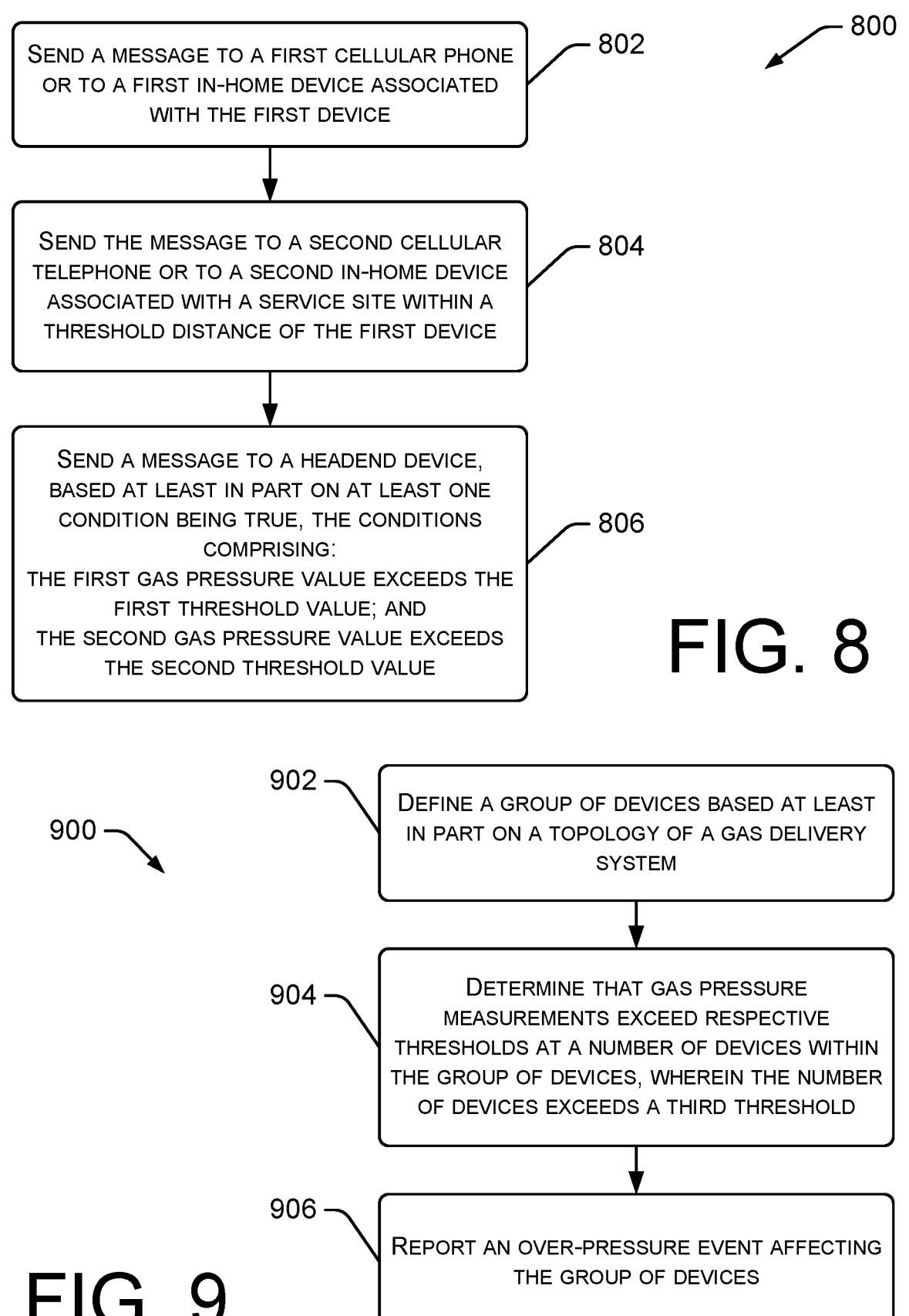

800

SEND A MESSAGE TO A FIRST CELLULAR PHONE OR TO A FIRST IN-HOME DEVICE ASSOCIATED WITH THE FIRST DEVICE — 802

SEND THE MESSAGE TO A SECOND CELLULAR TELEPHONE OR TO A SECOND IN-HOME DEVICE ASSOCIATED WITH A SERVICE SITE WITHIN A THRESHOLD DISTANCE OF THE FIRST DEVICE — 804

SEND A MESSAGE TO A HEADEND DEVICE, BASED AT LEAST IN PART ON AT LEAST ONE CONDITION BEING TRUE, THE CONDITIONS COMPRISING:
THE FIRST GAS PRESSURE VALUE EXCEEDS THE FIRST THRESHOLD VALUE; AND
THE SECOND GAS PRESSURE VALUE EXCEEDS THE SECOND THRESHOLD VALUE — 806

902 — DEFINE A GROUP OF DEVICES BASED AT LEAST IN PART ON A TOPOLOGY OF A GAS DELIVERY SYSTEM

904 — DETERMINE THAT GAS PRESSURE MEASUREMENTS EXCEED RESPECTIVE THRESHOLDS AT A NUMBER OF DEVICES WITHIN THE GROUP OF DEVICES, WHEREIN THE NUMBER OF DEVICES EXCEEDS A THIRD THRESHOLD

906 — REPORT AN OVER-PRESSURE EVENT AFFECTING THE GROUP OF DEVICES

FIG. 9

NETWORK EDGE DETECTION AND NOTIFICATION OF GAS PRESSURE SITUATION

RELATED APPLICATIONS

This application is a continuation of and claims priority to U.S. patent application Ser. No. 17/939,856, filed Sep. 7, 2022, titled "Network Edge Detection and Notification of Gas Pressure Situation," which is a continuation of and claims priority to U.S. patent application Ser. No. 17/127, 896, filed Dec. 18, 2020, titled "Network Edge Detection and Notification of Gas Pressure Situation," the entirety of both which are incorporated herein by reference.

BACKGROUND

If gas pressure within a portion of a gas distribution system gets too high, it can cause pipes to burst, the venting of gas, dangerous pilot lights, damage to appliances and/or buildings, and even fires and explosions. Monitoring gas pressure is a complex matter, in part because pressure can vary due to many factors, including gas supply, user gas demand, pipe lengths, bends, joints, and gas friction with pipe interiors and other gas. Moreover, known systems tend to respond slowly to over-pressure events, in part because of latencies within communication networks, headend application latencies, and human delays. Accordingly, substantial gas pressure increases can result in damage before the increases are detected, reversed and/or mitigated.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 5 is a flow diagram showing an example of detecting a high gas pressure condition.

FIG. 6 is a flow diagram showing example techniques for selecting a second device to which to send a message.

FIG. 7 is a flow diagram showing example techniques for responding to a high gas pressure condition FIG. 8 is a flow diagram showing additional example techniques for responding to a high gas pressure condition.

FIG. 9 is a flow diagram showing example techniques for defining and using groups of devices to detect a gas over-pressure condition.

DETAILED DESCRIPTION

Overview

Techniques for detecting a high gas pressure situation within a gas delivery system (e.g., for delivery of natural gas to homes and businesses) are described. In one example, a first device measures gas pressure. If a gas pressure that is over a threshold value is detected, the first device sends a message to a second device, which may be near the first device (e.g., both devices may be on a same gas delivery pipeline). The second device may respond by indicating its own gas over-pressure condition, thereby suggesting that the gas over-pressure condition is not localized at the first device (e.g., a first smart gas meter). Alternatively, the second device may not detect and/or report an over-pressure condition, thereby suggesting that the over-pressure condition may be localized to the first device.

In a further example, the first device may share information about its over-pressure condition with devices within a group defined to include the first and the second devices and other devices. Members of the group may share information with devices in any group(s) in which they are members and/or with devices that are within a threshold physical (geographic) distance. An appropriate response may be made within the gas delivery system depending on if the over-pressure condition is localized to the first device, or more widely present within the group of devices. In examples, protective measures may be taken, such as closing valves providing gas to appropriate service sites, and such as sending warning notices to a headend device (e.g., to the utility company), to users' devices including users' cell-phones and in-home devices, and to any other device(s) that may assist in mitigating damage and/or injury.

Example System and Techniques

Figure 1:
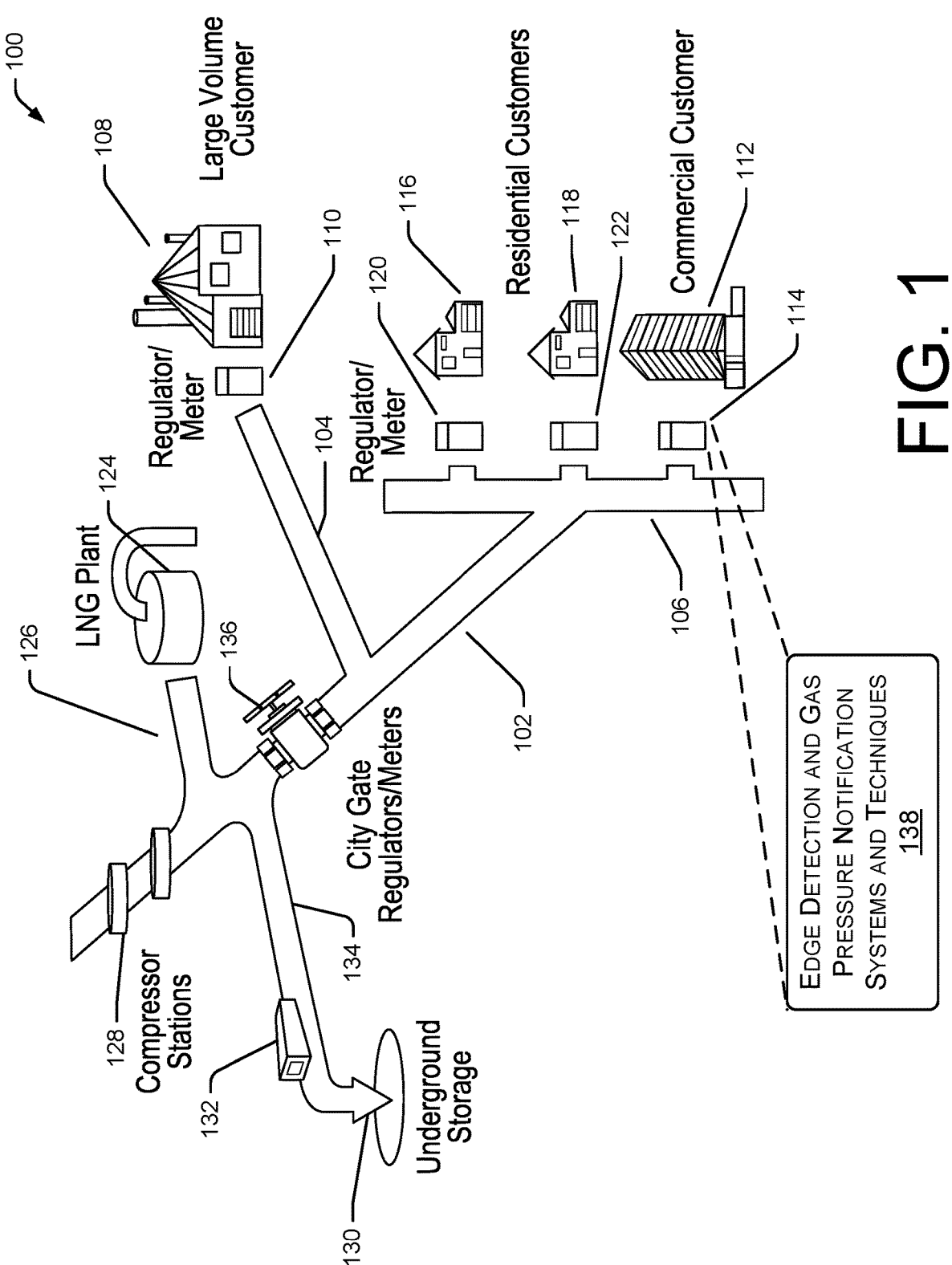
FIG. 1 is a diagram showing an example gas delivery system illustrating devices used in detection and notification of gas pressure abnormalities.

FIG. 1 shows an example gas delivery system 100. If pressure in an area of the gas distribution system 100 is too high, the pressure may cause damage. The gas delivery system 100 is configured having devices and techniques of operation that detect, notify and mitigate or resolve overly high gas pressure conditions.

In the example system 100, a major gas main 102 supplies gas to several local gas mains 104, 106. In the example, the local gas main 104 supplies gas to large gas volume customer(s) 108 having associated gas pressure regulators and metering devices 110. The local gas main 106 supplies gas to commercial customer(s) 112 having associated gas pressure regulators and metering devices 114. The local gas main 106 also supplies gas to residential customer(s) 116, 118 having associated gas pressure regulators and metering devices 120, 122.

The local gas main 104 and the devices attached to it may constitute a group of devices for purposes of an algorithm (discussed at FIGS. 5-9 and other locations) that detects, notifies and/or mitigates/resolves a situation wherein devices within the logical group detect gas pressure over a threshold value. The group may be based at least in part on knowledge of the topology of the gas delivery system. A topological description of the gas delivery system may be configured within a database or other data structure. In an example, the topological description may include a listing of devices in the system, their characteristics, and how, when, where, and/or to what they are connected. The topology may include "states" of devices, such as a valve being open or closed, or a gas main having a certain pressure, a battery having a certain charge, etc. Similarly, the local gas main 106 and devices attached to it may constitute a second group. Each device in the system 100 may be considered to be in one or more groups. The groups may be formed in a manner that logically groups devices so that data from one device may be synergistically interpreted using data from other device(s) in the group. For example, if one device recognizes a gas pressure over a threshold pressure value, that event is reported to other devices in a group. A confirmation of high pressure by other devices in the group tends to indicate a region of high gas pressure rather than an area of localized high gas pressure.

A liquid natural gas (LNG) plant 124 provides gas to the delivery system 100 at local gas main 126. Compressor stations 128 create, regulate and/or maintain the gas pressure within gas mains and local delivery pipes within the system 100. An underground gas storage reservoir 130 and regulator 132 provide additional gas through a gas pipe 134 to the system 100.

Within the system 100, gas flows from locations having higher gas pressures upstream (e.g., the LNG plant 124, the compressor stations 128, and the underground storage 130) and to areas having lower pressures downstream (e.g., the customers 108, 112, 116 and 118).

Additionally, the gas pressure within the gas delivery system 100 can vary from city gate regulators/meters 136 in the system to the downstream service point gas pressure regulators and meters. Example factors resulting in pressure drop include pipe length, pipe bends and joints, and internal gas-against-gas and gas-against-pipe friction.

The example system 100 is configured to monitor pressure at a plurality of points, thereby providing control systems and techniques of operation that anticipate, detect and/or mitigate unsafe situations, and avoid unsafe situations resulting from network latencies, headend application latencies, and/or human delays. In the example system 100, the gas meter/gas pressure regulator 114 is configured to include edge detection and gas pressure notification systems and techniques 138. In an example, the techniques 138 are enabled by execution of software, which may be defined in memory and executed by a processor. Other devices shown in the system 100 may contain the same or similar edge detection and gas pressure notification systems and techniques 138. The edge detection and gas pressure notification systems and techniques 138 are configured and operate according to one or more of the examples shown, discussed and/or suggested by the examples of FIGS. 2-9.

Figure 2:
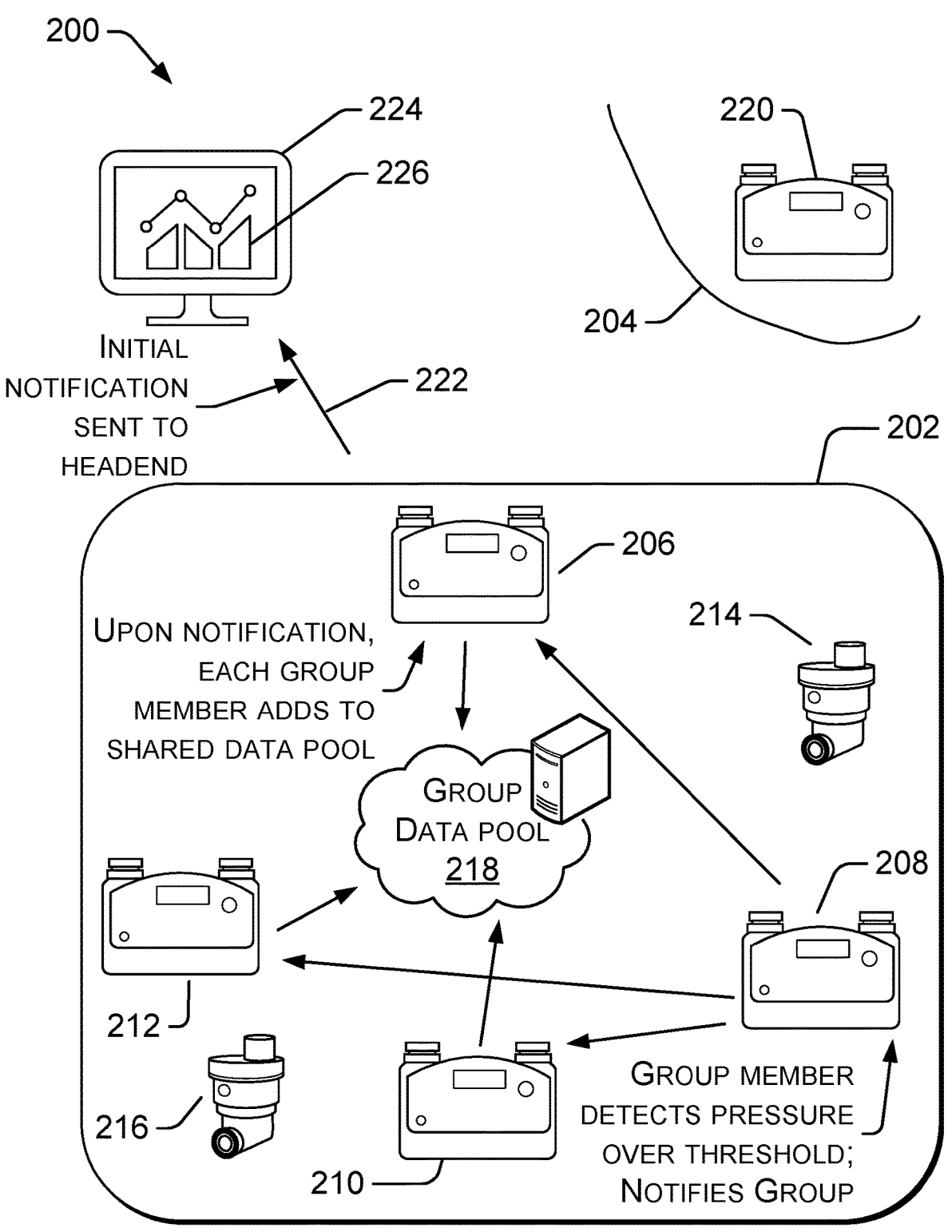
FIG. 2 is a diagram showing an example gas delivery system illustrating the function of groups of devices, such as in data-gathering.

FIG. 2 shows an example gas delivery system 200 illustrating example functionality of groups of devices, particularly showing a data-gathering functionality. A first example group 202 of devices includes four gas meters 206-212. The first group 202 additionally includes two valves 214, 216. The valves may be associated with segment pipelines or "stub pipelines" off a main gas pipeline (e.g., pipes 104, 106 of FIG. 1). The valves 214, 216 may allow gas to be turned on/off to more than one gas service site (i.e., more than one gas metering device).

The first group 202 may also include a group data pool 218, which may be located in any desired location, such as a remote server, one or more of the gas metering devices, or a dedicated device, etc. The data pool 218 may include information regarding a topology of some or all of the gas delivery system 200, and time-stamped pressure measurements and/or pressure thresholds of gas pressure measuring devices in one or more groups of devices. The data pool 218 may also identify groups of devices according to geography and/or connectivity within the gas delivery system topology.

A group may include devices on a segment of gas pipeline serving a related group of gas customers (e.g., related by use of a same gas main and/or related by physical distance between any two devices of less than a threshold value).

The example gas delivery system 200 may also include other group(s), represented for drawing simplicity by group 204 and gas meter 220. The number of groups and the number of devices in each group may be based on the needs, conditions and design specification of a particular system, and are shown in FIG. 2 only to illustrate general concepts and not as requirements.

In an example, the gas consumption meters, valves, gas pressure-measuring devices, combined function devices, etc., may be configured in a group based on gas delivery system topology. In the example, some or all of the components (e.g., smart gas metering devices, valves, pipelines, etc.) along a gas pipeline serving a number of customer sites (associated with the smart gas metering devices) may be configured in a logical group. The pipeline may terminate after the last downstream customer's site. In some examples, an over-pressure event (e.g., gas pressure over a threshold) could be resolved by temporarily turning off the gas supply to the pipeline.

In an example of the operation of system 200, devices with pressure sensors (e.g., smart gas metering devices, etc.) can periodically compare their pressure readings to one or more high gas-pressure threshold values. The comparison may be made at prescribed intervals, random times, etc., as indicated by system design requirements, including available battery power, time since detection of an over-pressure event, and/or other considerations. If a device (e.g., a smart gas meter) detects that pressure has passed a relevant threshold value, the device can increase the rate of its gas-pressure sampling. Conversely, if the device detects normal gas pressure values for over a relevant threshold time value, it can decrease the rate of its gas-pressure sampling.

If a threshold gas-pressure value is exceeded, the device can send its latest pressure reading(s)—and in some examples, its relevant threshold values(s)—to its neighboring devices (e.g., devices within the group of devices) that also have gas pressure sensors.

Responsive to a message from a group member (e.g., smart gas metering device 208) sensing a higher than threshold gas pressure, other pressure sensing devices in the group (e.g., smart gas metering devices 206, 210, 212) can increase their rate of pressure sampling. Additionally, the other pressure sensing devices can add their own data set to the data pool 218 (e.g., a data pool associated with sensing devices in a geographic area and/or devices within a logical group). The data pool 218 may be used to determine if an over-pressure event is area-wide (e.g., caused by events on the distribution side) or if it is localized to the single service point and/or device. Such a collaboration between devices distributed on (or near) the edge of a gas distribution system reduces the chance that decisions will be made based on false positives.

Data from group 202 may be sent (e.g., by cellular or internet connection 222) to a headend device. In the example of FIG. 2, the data sent to the headend device 224 may include an initial notification by one of the gas pressure-measuring devices that a high gas pressure event (e.g., gas pressure over a threshold) has been detected. The measured gas pressure and the threshold may be sent to the headend device. The threshold is relevant at least in that it puts into perspective what the preferred gas pressure is at the location at which the measurement was made. The headend device 224 may be a server of a utility company, a third-party

5 contractor of the utility company, or may be another device. In an example, the data 226 received from gas pressure-measuring devices and/or groups of such devices may be displayed for the situational-awareness of human operator(s) and/or used in algorithms that are involved in data-gathering, data-processing, and response(s) to gas over-pressure events. Example responses may include damage prevention procedures, such as shutting valves to prevent increases in gas pressure.

Figure 3:
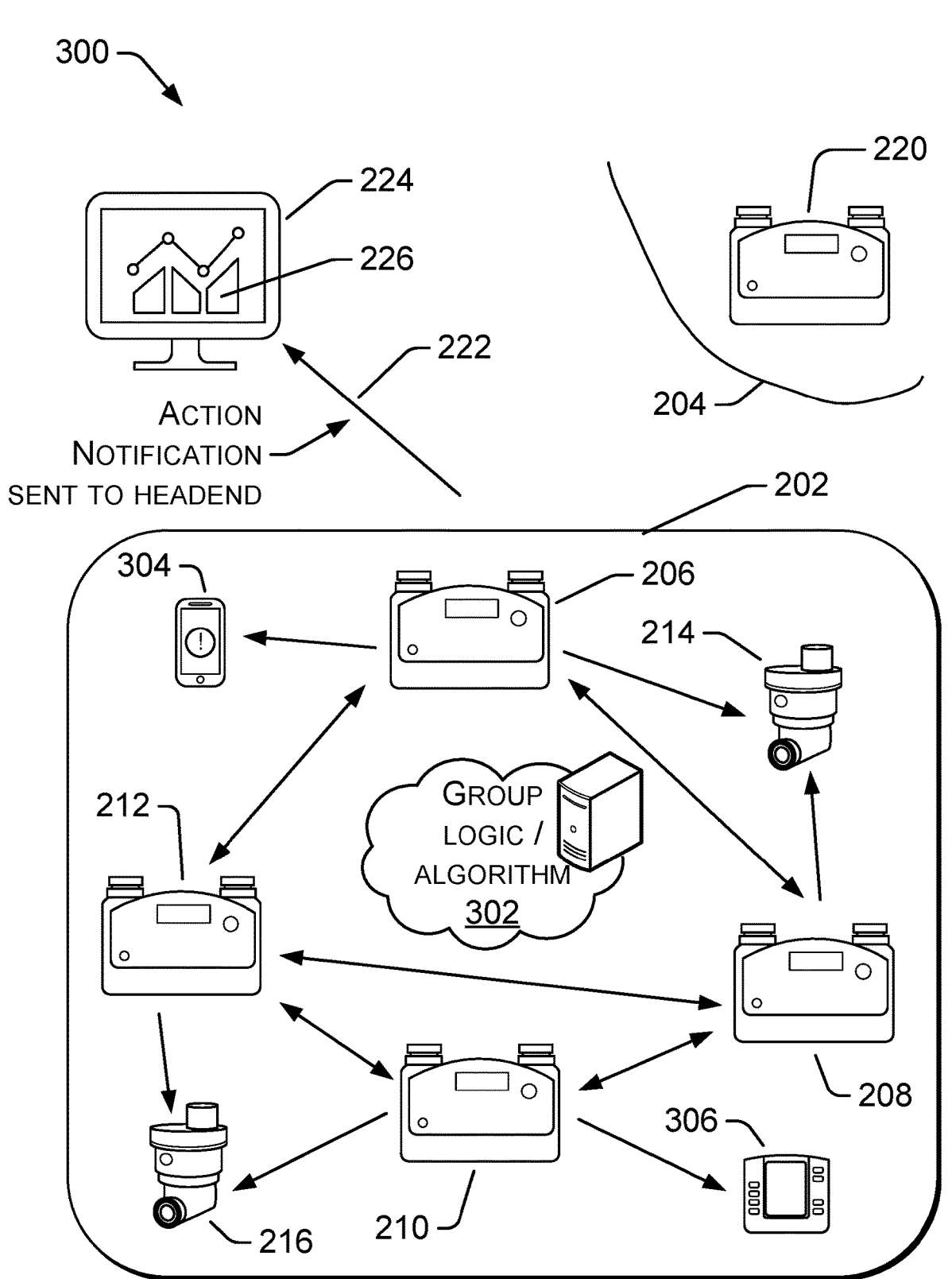
FIG. 3 is a diagram showing an example gas delivery system illustrating the function of groups of devices, such as in data-utilization.

FIG. 3 shows an example gas delivery system 300 containing enhancements to the gas delivery system 200 seen in FIG. 2. In the example, the gas delivery system 300 performs data-processing functions that formulate response(s) to gas over-pressure events, and send appropriate commands to initiate the response(s). The responses may address local gas over-pressure events (e.g., detected by a single smart gas metering device) or area-wide gas over-pressure events (e.g., detected by plural smart gas metering devices within a group of devices).

In the example, an algorithm 302 (e.g., a "group algorithm") may utilize data from the group data pool 218 of FIG. 2 to determine a response to an over-pressure event seen by: a gas pressure-measuring device from among those in a group; and/or a group of smart gas pressure-measuring devices. The algorithm 302 may be based at least in part on the techniques and methods presented in FIGS. 5 through 9.

The group is typically based on a topology of the gas delivery system, and may include pipelines, smart gas meters (e.g., meters with gas pressure-measuring capabilities), other gas pressure gauges, valves, and other devices. The group algorithm 302 can consider the rate of pressure increase so that severity and urgency of the issue can be evaluated. If the rate of gas pressure increase is "slower" (e.g., a rate of change that is less than a threshold value), then the devices may provide instructions for an initial mitigating action that includes a service technician dispatched by the utility company. In contrast, if the group of devices (e.g., algorithm 302) determines that the situation is "faster" (e.g., a rate of change that is greater than the threshold value), then immediate mitigating action should be taken. The algorithm may direct the group of devices to perform automatic shutoffs of their own valves, send shutoff commands to valves in other devices around them, send alarms with pressure sampling data to the headend system for utility notification, and send alerting information to customers' cellular phones 304 and/or in-home devices 306 to warn the end-customer of the safety situation.

Figure 4:
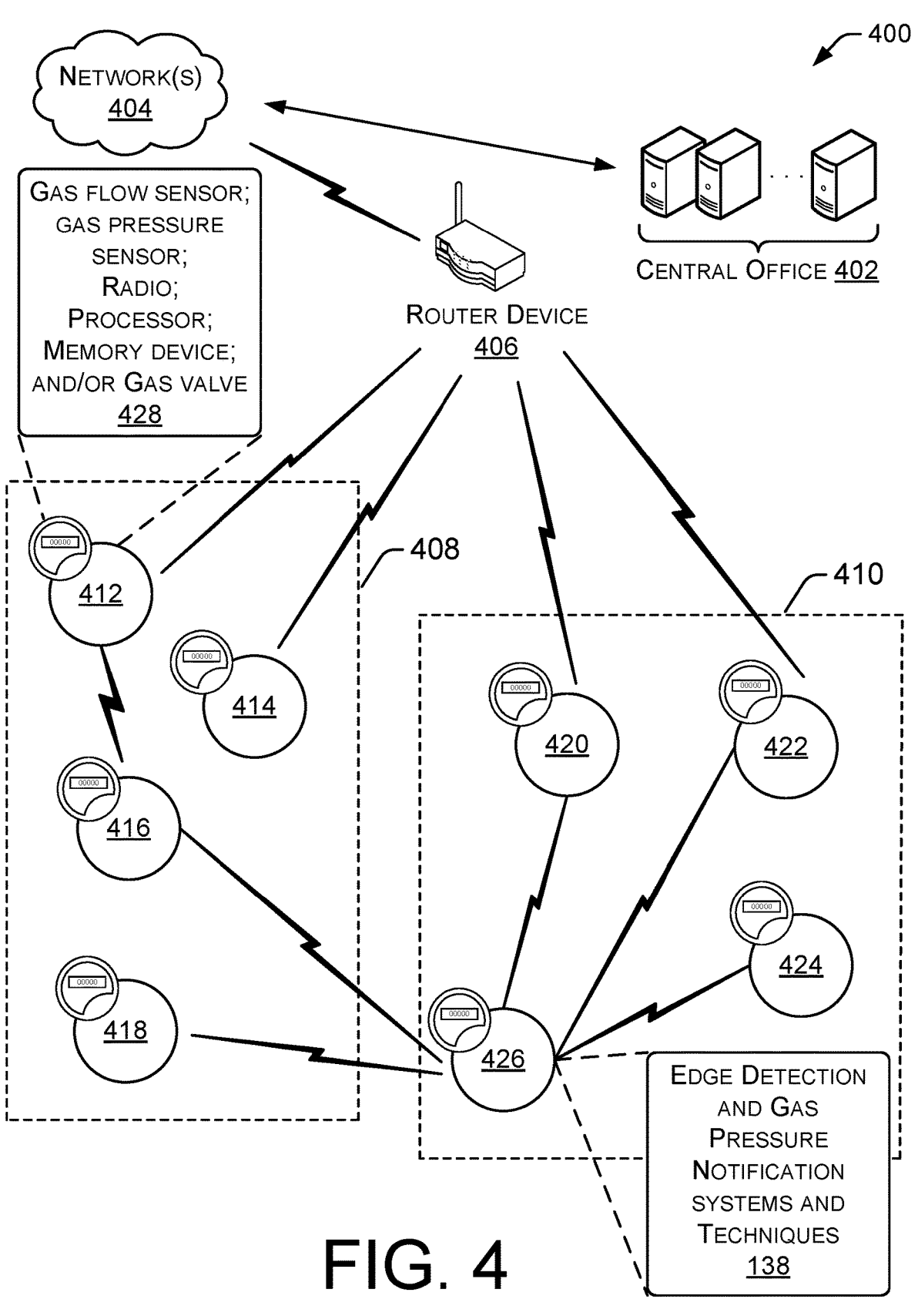
FIG. 4 is a diagram showing an example gas delivery system illustrating data collection, data transmission, and data utilization.

FIG. 4 shows an example gas delivery system 400 illustrating data collection, data transmission, and data utilization. A central office 402 may be operated by a utility company, a third-party contractor or other entity. The central office may be in communications with networks 404, such as the internet and/or cellular telephone networks, or proprietary networks. In some examples, a router device 406 may (optionally) be in communication with a plurality of devices in one or more groups 408, 410 of devices of the gas delivery system 400. In the example shown, the first group of devices includes smart gas metering devices 412-418 and the second group of devices 420-426. Each smart gas metering device may include hardware devices 428. In different examples, the hardware devices 428 may include one or more of a gas metering device, a gas pressure sensor, a radio, a processor, a memory device, and/or a gas valve, etc. The devices 428 may be configured (e.g., with software) to perform some or all of the edge detection and gas pressure recognition, notification, and mitigation/repair systems and techniques 138.

6

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory (e.g., the memory device(s) of hardware 428) may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EE-PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIG. 5 shows an example method 500 of detecting a high gas pressure condition. The method detects high gas pressure situation(s) within a gas delivery system. In an example, a first device (e.g., smart gas metering device) measures gas pressure and determines if that pressure is over a threshold value. If so, the first device sends a message to at least one other device. In an example, the message is sent to device(s) within a group of devices based on gas system topography (e.g., the group of devices are smart metering devices having a common gas supply line). The receiving devices may respond by indicating if they are experiencing a gas over-pressure condition. If so, the gas over-pressure condition is not localized at the first device. Alternatively, the second device(s) may indicate that it/they is/are not in an over-pressure condition, thereby suggesting that the over-pressure condition may be localized to the first device. An appropriate response may be made within the gas delivery system depending on if the over-pressure condition is localized to the first device, or more widely present within the group of devices. In examples, protective measures may be taken, such as closing valves providing gas to appropriate service sites.

At block 502, gas pressure is measured at a device to obtain a first gas pressure value. In the example of FIG. 1, the first device may be the smart metering device 206, and may measure gas pressure at a customer's site.

At block 504, it is determined that the first gas pressure value exceeds a first threshold value. In the example, the smart metering device 206 may perform the calculation with respect to the first threshold value. In other examples, the calculation may be performed at a headend device or other location. In the example of block 506, in response to determining that the first gas pressure value exceeds the first threshold value, a rate at which gas pressure is measured is increased.

At block 508, at least one of the first gas pressure value, a threshold value, and an indication that the first gas pressure value exceeds the first threshold value is sent from the first device to second device(s). In some examples, the second device(s) to which data is sent are selected from among devices in a group also including the first device. By defining one or more groups of devices, the gas pressure information of one or more group members can be used synergistically to anticipate gas over-pressure events at other group members. In additional examples, the data is sent from the first device to devices selected based on a topology of the gas delivery system (e.g., the device(s) may be selected based on connection to a same gas main), possibly without formally defining groups of devices. In further examples, the data is sent from the first device to device(s) less than a threshold distance from the first device. In still further examples, the data is sent from the first device to device(s) based on one or more of the above examples.

At block 510, information comprising at least one of a second gas pressure value indicating gas pressure at the second device or an indication of whether the second gas pressure value exceeds a second threshold value is received. In a first example, the first device receives the information. In a second example, the information could be received at a headend server or other device at any location.

At block 512, "local" high gas-pressure event may be reported, if high gas pressure was detected only at the first device. In an example, a high gas-pressure event at the device may be based at least in part on the second gas pressure value being at or below the second threshold value. In the example, if the second gas pressure of the second device does not exceed that device's threshold value then only a local high gas-pressure event at the first device is reported.

At block 514, a "group-wide" high gas-pressure event may be reported, if high gas pressure was detected at the first device and at the second device(s). In an example, a high gas-pressure event within a distribution area of the device and the second device is reported (e.g., to a headend device and/or to all devices within the group) based at least in part on the second gas pressure value (at the second device) exceeding the second threshold value (which may or may not be the same as the first threshold value).

At block 516, a high gas-pressure event may be anticipated because the rate of gas pressure increase is high at any device, even if the gas pressure has not yet exceeded a threshold value. In an example, it may be determined that a rate of gas pressure increase (e.g., at the first device or second device) exceeds a third threshold value. When the rate of gas pressure increase is high (even if the actual gas pressure has not yet exceeded a threshold value) it may be important to realize that the gas pressure is changing fast (i.e., increasing), that an over-pressure event may happen soon, and that protective measures should be taken even before high gas pressure thresholds are exceeded.

At block 518, a first gas valve of the first device is closed based at least in part on the high gas-pressure event at the first device. In an example, the first gas valve may be closed in response to a local high gas-pressure event. In the example of block 520, gas valves at additional devices may be closed based on gas pressure exceeding respective thresholds of the additional devices. In an example, the second gas valve of the second device (e.g., the device discussed at block 510) may be closed in response to a high gas-pressure event at that device. In the example of block 522, devices within a group of devices are notified and/or directed to close their respective gas valves. In an example, this direction may be in response to high gas-pressure events at the first and second devices. Because the group of devices is based at least in part on the topology of the gas delivery system, all devices in the group may be under a high gas-pressure condition, and closing some or all of the gas valves within the group may be indicated.

FIG. 6 shows example techniques 600 for selecting a second device to which to send a message. At block 508 of FIG. 5, information was sent from the first device (which recognized a gas over-pressure event at its location) to one or more other devices. In an example, the device sensing an over-pressure event attempts to determine if the over gas-pressure condition is limited in extent (e.g., limited to itself), or more broadly includes other devices. The techniques 600 include two examples, which may be used singly or in combination, to determine to which device(s) a first device that senses an over-pressure event should send over-pressure information and send a request (explicit or implied) for the receiving device to perform tasks, such as measuring gas pressure, increasing a frequency or rate of such measurements, comparing measurements to thresholds, and/or taking actions to lessen/prevent damage from a high gas pressure event. In some examples, if the first device sends its gas pressure information to one or more other devices, those device(s) may assume that the first device is experiencing an over-pressure event (i.e., the over-pressure event at the first device is why the message was sent). In other examples, if a threshold value is also sent by the first device, the second device(s) may readily determine the amount by which measured gas pressure at the first device exceeded a threshold of the first device.

At block 602, second device(s)—to which the first device may send gas pressure and/or threshold value information—may be selected from among a plurality of devices. In some examples, the selecting is based at least in part on data describing aspects of a topology of a gas delivery system to which the first device and the second device are connected, and wherein the selecting is performed prior to the sending. In some examples, the selecting is based at least in part on a distance between the first and second devices. If the distance between the first device and other devices is less than a threshold distance, the first device may send gas pressure and/or threshold value information to those devices.

At block 604, an RF signal strength of a signal sent by the second device is measured. The signal strength of the second device, measured at the first device, helps the first device determine a distance to the second device. The second device may be selected from among a plurality of devices based at least in part on the measured RF signal strength of each respective device from among the plurality of devices. In an example, a device is selected based on which device(s) appear to be closer to the first device, or which device(s) are less than a threshold distance from the first device.

FIG. 7 shows example techniques 700 for responding to a high gas pressure condition. The techniques 700 include two examples, which may be used singly or in combination, to mitigate or prevent damage to the gas supply system and/or customers' appliances and infrastructure that might otherwise result in an over-pressure event. In some examples, a valve is closed on a single device to prevent additional gas from entering a part of the gas delivery system, which would further increase the gas pressure. In other examples, valves are closed on multiple devices to prevent such damage.

At block 702, based at least in part on the second gas pressure value exceeding the second threshold value, a shutdown command is sent to a group of devices. In an example, each device in the group of devices is connected to a gas main to which the device is connected or is within a threshold distance of the device.

At block 704, based at least in part on the second gas pressure value exceeding the second threshold value, a supply of gas to a region within a gas distribution system is shut off. In an example, the region includes the device and the second device. In a further example, the region includes all devices (e.g., smart gas meters) attached to a same gas delivery pipe. In a further example, the region includes all devices within a group of devices, and the group is defined based at least on a database containing a topological description of the gas delivery system. The topological description of the gas delivery system may include a listing of devices in the system, their characteristics, and how, when, where, and/or to what they are connected.

FIG. 8 shows additional example techniques 800 for responding to a high gas pressure condition. The techniques 800 include three examples 802-806, which may be used singly or in one or more combinations, to send messages to devices (e.g., cellular devices, in-home devices, headend devices, etc.). The messages may be sent in response to a first device detecting over-pressure gas conditions or a second device that checked gas pressure conditions responsive to message(s) from the first device.

At block 802, a message may be sent to a first cellular phone or to a first in-home device associated with the first device (e.g., a smart gas meter). The message may warn the recipient of an over-pressure event, and may suggest a course of action (such as evacuation of the property). In a variation of block 802, the message may be sent to authorities (e.g., 911, emergency, the fire department, etc.). The message may include the nature of the over-pressure event, the address(es) of the event, a suggested course of action, etc.

At block 804, the message (or a similar message) may be sent to a second cellular telephone or to a second in-home device associated with a service site within a threshold distance of the first device. Messages (e.g., warnings) may be sent to additional service sites if the over-pressure event does not appear to be limited to a single service site.

At block 806, the message (or a similar message) may be sent to a headend device, based at least in part on at least one condition being true, the conditions including: the first gas pressure value exceeds the first threshold value; and the second gas pressure value exceeds the second threshold value.

FIG. 9 shows example techniques 900 for defining and using groups of devices, detection of a gas over-pressure condition, and reporting the over-pressure event affecting the group of devices. The techniques 900 include grouping devices based at least in part on gas system topography, determining that gas-pressure threshold(s) have been exceeded at one or more devices in a group of devices, and reporting gas over-pressure events in messages and/or warnings to users and/or authorities (e.g., 911). The reporting may be based at least in part on the group associated with the device(s) found to have over-pressure events. By recognizing common features of devices and grouping them, the reporting can include devices that are in danger of an over-pressure event but may not have even realized the situation. The failure to realize the situation may result from a frequency of gas pressure measurement. Accordingly, the use of groups leverages the measurements of one device (e.g., smart gas meter) to protect the service site of another device.

At block 902, a group of devices is defined based at least in part on a topology of a gas delivery system. In an example, the topology may be used to organize the group based on some or all devices related to, or attached to, a gas pipeline serving a number of customer sites. In a further example, each device of the group may be within a threshold distance of all other devices of the group. The devices may include a gas source (e.g., an LNG plant), a pipeline, a number of smart gas meters, gas valves, in-home devices, etc.

At block 904, it is determined that gas pressure measurements exceed respective thresholds at one or more devices within the group of devices. The number of devices with gas pressure that is over-pressure may be compared to a third threshold, such as to reduce false positives. In an example, one device measures gas pressure over a threshold and alerts other device(s) to measure their gas pressure and/or increase a frequency of gas pressure measurements.

At block 906, an over-pressure event that affects the group of devices is reported. The over-pressure event may be reported by one or more smart gas meters or other devices. The over-pressure event may be reported to the customer(s) at affected sites, including reports made to in-home devices, cellular telephones, etc. Reports may be sent to customer(s) at sites that are geographically near the affected sites. Alternatively, or additionally, reports may be sent to customer(s) at sites that are related to site(s) detecting the over-pressure event by aspects of the topology of the gas delivery system. For example, the aspects of the topology may include sites served by a same gas main, sites served by a same gas supply facility, sites having gas flow affected by same valve(s), etc.

Example Systems and Devices

If pressure in an area of a gas distribution system gets too high, it can cause pipe bursting, gas venting, enlarged and unsafe pilot lights, and possibly fires and explosions. Gas flows from higher pressures upstream to lower pressures downstream. Additionally, the gas pressure within a gas delivery system can vary from city gate regulators and meters in the system to the end service point regulators and meters. Example factors governing pressure drop include the length of runs (e.g., the length of gas mains), number of pipe bends and joints, and internal gas against pipe friction. By monitoring pressure at a plurality of points, the system increases the ability for utility companies to anticipate, detect and/or mitigate unsafe situations, and avoid unsafe situations with network latencies, headend application latencies, and human delays. The systems and techniques (e.g., smarter gas metering devices) at service points provide the means to self-monitor for unsafe situations. In some examples, the systems and techniques also monitor not only at the single point at which the equipment is installed, but also an area surrounding the location of the equipment. In the example, such monitoring is performed by exchanging information with smart metering devices at nearby service sites. In many examples, the gas delivery system performs actions that automatically mitigate unsafe situation(s).

Devices with pressure sensors (e.g., smart gas metering devices, etc.) can periodically compare their pressure readings to one or more high gas-pressure threshold values. If a device detects that pressure has passed one of the thresholds it can increase the rate of its pressure sampling and can send its latest pressure readings and thresholds to its neighboring devices that also have pressure sensors. The other pressure sensing devices can likewise increase their rate of pressure sampling and add their own data set to a group data pool (e.g., a data pool associated with sensing devices in a logical group defined according to a geographic area, according to pipelines, and/or according to a gas supply topology). The data pool may be used to determine if an over-pressure event is area-wide (e.g., caused by events on the distribution side) or if it is localized to the single service point and/or device. Such a collaboration between devices distributed on (or near) the edge of a gas distribution system reduces the chance that decisions will be made based on false positives.

The group algorithm can consider the rate of pressure increase so that severity and urgency of the issue can be evaluated. If the rate of gas pressure increase is "slow," the devices may provide instructions for an initial mitigating action that includes a service technician dispatched by the utility company. In contrast, if the group of devices determines that the situation is real, urgent, and that immediate mitigating action needs to take place, the group of devices can perform automatic shutoffs of their own valves, send shutoff commands to valves in other devices around them, send alarms with pressure sampling data to the headend system for utility notification, and send information to in-home devices to warn the end-customer of the safety situation.

The logic that controls actions of the gas delivery system (e.g., that controls points to shut off) relies on knowledge of the distribution system service point connections and location of regulators and/or gate valves that "segment" portions of that distribution system. Additionally, the physical distance between service points may be considered even if they are not on the same distribution line. Devices can know their group (or groups) via pre-programming (e.g., programming at time of manufacture), programming at install time, self-discovery, and/or by hearing network radio frequency (RF) messages. In other examples, devices can be configured to be within one or more groups via network or local communication based on distribution topology.

In some examples, the logic that controls actions of the gas delivery system can be based at least in part on a topology of the gas delivery system. The topology may include all the gas supply facilities, gas pipes, valves, gas meters and other devices used in gas supply. An augmented topology may include communications devices, such as radios that allows control circuits to operate the gas delivery devices (e.g., valves). The topology of the gas delivery system (with or without augmentation to include communications devices) may be instantiated in a database or other data structure.

In different examples, the techniques discussed herein could additionally and/or alternatively be applied to low-pressure situations in a gas distribution system. The low-pressure conditions are not as urgent as high-pressure conditions, but can help mitigate loss of pressure in a system which can lead to pilot lights going out and costly re-lighting processes.

1. A method, comprising: measuring gas pressure at a first device to obtain a first gas pressure value; determining that the first gas pressure value exceeds a first threshold value; sending at least one of the first gas pressure value or an indication that the first gas pressure value exceeds the first threshold value to a second device; receiving information comprising at least one of a second gas pressure value indicating gas pressure at the second device or an indication of whether the second gas pressure value exceeds a second threshold value; reporting at least one of: a high gas-pressure event at the first device based at least in part on the second gas pressure value being at or below the second threshold value; or a high gas-pressure event within a distribution area comprising the first device and the second device based at least in part on the second gas pressure value exceeding the second threshold value; and responsive to determining that the first gas pressure value exceeds the first threshold value, closing a valve of the first device.

2. The method of clause 1, additionally comprising: responsive to determining that the first gas pressure value exceeds the first threshold value, increasing a rate at which gas pressure is measured at the first device.

3. The method of clause 1 or any preceding clause, wherein responsive to the received information that the second gas pressure value exceeds the second threshold value, the method additionally comprises: closing a gas valve of the second device; and notifying devices within a group of devices to close their respective gas valves.

4. The method of clause 1 or any preceding clause, additionally comprising: determining that a rate of gas pressure increase exceeds a third threshold value; and closing a gas valve at the first device.

5. The method of clause 1 or any preceding clause, additionally comprising: shutting off, based at least in part on the second gas pressure value exceeding the second threshold value, a supply of gas to a region within a gas distribution system, wherein the region includes the first device and the second device.

6. The method of clause 1 or any preceding clause, additionally comprising: sending a message to a first cellular phone or to a first in-home device associated with the first device; sending the message to a second cellular telephone or to a second in-home device associated with a service site within a threshold distance of the first device; and sending a message to a headend device, based at least in part on at least one condition being true, the conditions comprising: the first gas pressure value exceeds the first threshold value; and the second gas pressure value exceeds the second threshold value.

7. The method of clause 1 or any preceding clause, additionally comprising: selecting the second device from among a plurality of devices, wherein the selecting is based at least in part on data describing aspects of a topology of a gas delivery system to which the first device and the second device are connected, and wherein the selecting is performed prior to the sending.

8. The method of clause 1 or any preceding clause, additionally comprising: measuring an RF signal strength of a signal sent by the second device; and selecting the second device from among a plurality of devices based at least in part on the measured RF signal strength.

9. The method of clause 1 or any preceding clause, additionally comprising: sending, based at least in part on the second gas pressure value exceeding the second threshold value, a shutdown command to a group of devices, wherein each device in the group of devices is connected to a gas main to which the first device is connected or is within a threshold distance of the first device.

10. The method of clause 1 or any preceding clause, additionally comprising: defining a group of devices based at least in part on a topology of a gas delivery system; determining that gas pressure measurements exceed respective thresholds at a number of devices within the group of devices, wherein the number of devices exceeds a third threshold; and reporting an over-pressure event affecting the group of devices.

11. A device, comprising: a gas pressure sensor; a radio; a processor; memory, having defined thereon statements, which when executed by the processor perform actions comprising: measuring gas pressure, by operation of the gas pressure sensor, to obtain a first gas pressure value; determining that the first gas pressure value exceeds a first threshold value; sending, by operation of the radio, at least one of the first gas pressure value or an indication that the first gas pressure value exceeds the first threshold value to a second device; receiving, by operation of the radio, information comprising at least one of a second gas pressure value indicating gas pressure at the second device or an indication of whether the second gas pressure value exceeds a second threshold value; reporting a high gas-pressure event within a distribution area comprising the device and the second device based at least in part on the second gas pressure value exceeding the second threshold value; and reporting a high gas-pressure event at the device based at least in part on the second gas pressure value being at or below the second threshold value.

12. The device as recited in clause 11, additionally comprising: a database comprising topological relationships of devices within a gas supply system to which the device is connected, wherein the second device, to which data is sent, is selected based at least in part on reference to the database indicating that the device and the second device are on a same gas main.

13. The device as recited in clause 11 or any preceding clause, wherein the actions additionally comprise: measuring signal strength; and selecting devices to which to send information using the measured signal strength.

14. The device as recited in clause 11 or any preceding clause, wherein:
the device additionally comprises a gas valve; and the actions additionally comprise closing the gas valve based at least in part on the first gas pressure value.

15. The device as recited in clause 11 or any preceding clause, wherein the actions additionally comprise: sending gas shutoff commands to devices based at least in part on two or more high gas pressure events; sending alarms with pressure sampling data to a headend system; sending information to at least one of a first cellular telephone and an in-home device to warn a customer of the high gas-pressure event at the device; sending information of the high gas-pressure event to at least one of a second cellular telephone and an in-home device of a second customer within a threshold distance of the device; and shutting a gas valve responsive to the high gas-pressure event at the device.

16. A method, comprising: measuring gas pressure by operation of a first device to obtain a first gas pressure value; determining that the first gas pressure value exceeds a first threshold value; sending at least one of the first gas pressure value or an indication that the first threshold value was exceeded to a second device; measuring gas pressure by operation of the second device to obtain a second gas pressure value; determining that the second gas pressure value exceeds a second threshold value; reporting a high gas-pressure event within a distribution area comprising the first device and the second device based at least in part on the second gas pressure value exceeding the second threshold value; and reporting a high gas-pressure event at the first device based at least in part on the second gas pressure value being at or below the second threshold value.

17. The method of clause 16, additionally comprising: updating a database to include gas pressure measurements and gas pressure measurement locations, wherein the database includes data describing aspects of a topology of a gas delivery system to which the first device and the second device are connected.

18. The method of clause 16 or any preceding clause, additionally comprising: accessing a database comprising data describing aspects of a topology of a gas delivery system to which the first device and the second device are connected, wherein the topology comprises data indicating gas mains, locations on the gas mains at which devices are attached, and valves associated with attached devices; and closing a gas valve selected from among at least two gas valves, wherein the gas valve was selected based at least in part on information obtained from accessing the database.

19. The method of clause 16 or any preceding clause, additionally comprising: associating the first device and the second device in a group; saving data generated by devices in the group in a database, wherein the data comprises gas pressure measurements, times of measurements, and locations of measurements; and closing valves associated with each device in the group in response to the high gas-pressure event within the distribution area.

20. The method of clause 16 or any preceding clause, additionally comprising: reporting the first gas pressure value and the second gas pressure value to a headend device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method, comprising:
defining a group of gas meters of a gas-delivery system, wherein the group of gas meters comprises a plurality of gas meters, and wherein the defining is based at least in part on a topology of the gas-delivery system;
measuring gas pressure at each gas meter of the group of gas meters;
determining, based on the measuring, that gas pressure measurements at gas meters of the group of gas meters exceed threshold values, wherein the threshold values are respectively associated with each gas meter within the group of gas meters, and wherein a number of gas pressure measurements exceeding respectively associated threshold values is greater than a further threshold value; and
responsive to the further threshold value being exceeded:
sending a shutoff command to the group of gas meters; or
closing valves of the group of gas meters.

2. The method of claim 1, wherein the gas pressure measurements comprise:
rates of gas pressure increase at one or more gas meters of the group of gas meters.

3. The method of claim 1, additionally comprising:
increasing a rate of the gas pressure measurements at a gas meter in the group of gas meters responsive to the gas meter measuring a gas pressure over a threshold value.

4. The method of claim 1, wherein each gas meter in the group of gas meters is connected to a same gas main.

5. The method of claim 1, additionally comprising:

sending, responsive to the further threshold value being exceeded, a message indicating an over pressure event.

6. The method of claim 1, wherein the topology is based on elements comprising:

a listing of gas meters;

gas mains to which gas meters in the listing of gas meters are connected; and at least one state of gas meters in the listing of gas meters.

7. The method of claim 1, additionally comprising:

accessing a database comprising topological relationships of the gas meters of the group of gas meters; and changing an entry in the database to indicate that a valve of a gas meter is closed.

8. A gas meter, comprising:

a gas pressure sensor;

a radio;

a processor; and memory, having defined thereon statements, which when executed by the processor perform actions comprising:

defining a group of gas meters of a gas-delivery system, wherein the group of gas meters comprises a plurality of gas meters, and wherein the defining is based at least in part on a topology of the gas-delivery system;

measuring gas pressure at each gas meter of the group of gas meters;

determining, based on the measuring, that gas pressure measurements at gas meters of the group of gas meters exceed threshold values, wherein the threshold values are respectively associated with each gas meter within the group of gas meters, and wherein a number of gas pressure measurements exceeding respectively associated threshold values is greater than a further threshold value; and responsive to the further threshold value being exceeded:

sending a shutoff command to the group of gas meters; or closing valves of the group of gas meters.

9. The gas meter of claim 8, wherein the statements are additionally configured to perform actions comprising:

determining that a gas pressure measurement at a gas meter of the group of gas meters exceeded a threshold value;

determining that gas pressure measurements at other gas meters of the group of gas meters did not exceed threshold values, wherein the threshold values are respectively associated with each of the gas meters within the group of gas meters, and wherein the number of measurements exceeding respectively associated threshold values is less than the further threshold value; and reporting, responsive to the further threshold value not being exceeded, an over-pressure event affecting the gas meter of the group of gas meters.

10. The gas meter as recited in claim 8, wherein the statements are additionally configured to perform actions comprising:

sending, by operation of the radio, an indication of an over-pressure event.

11. The gas meter as recited in claim 8, wherein:

the gas meter additionally comprises a gas valve; and the actions additionally comprise closing the gas valve based at least in part on an over-pressure event.

12. The gas meter as recited in claim 8, additionally comprising a database, the database comprising:

a listing of gas meters;

devices to which gas meters in the listing of gas meters are connected; and one or more states of one or more of the devices.

13. The gas meter as recited in claim 8, wherein the statements are additionally configured to perform actions comprising:

accessing a database comprising topological relationships of the gas meters of the group of gas meters; and changing an entry in the database to indicate that a valve of the gas meter is closed.

14. The gas meter as recited in claim 8, wherein the statements are additionally configured to perform actions comprising:

sending, responsive to an over-pressure event, the shutdown command to gas meters of the group of gas meters; and closing valves at gas meters of the group of gas meters.

15. The gas meter as recited in claim 8, wherein the gas pressure measurements comprise:

rates of gas pressure increase at one or more gas meters of the group of gas meters.

16. One or more non-transitory computer-readable media storing computer-executable instructions that, when executed by one or more processors, configure a computing device to perform acts comprising:

defining a group of gas meters of a gas-delivery system, wherein the group of gas meters comprises a plurality of gas meters, and wherein the defining is based at least in part on a topology of the gas-delivery system;

measuring gas pressure at each gas meter of the group of gas meters;

determining, based on the measuring, that gas pressure measurements at gas meters of the group of gas meters exceed threshold values, wherein the threshold values are respectively associated with each gas meter within the group of gas meters, and wherein a number of gas pressure measurements exceeding respectively associated threshold values is greater than a further threshold value; and responsive to the further threshold value being exceeded:

sending a shutoff command to the group of gas meters; or closing valves of the group of gas meters.

17. One or more non-transitory computer-readable media as recited in claim 16, wherein the gas pressure measurements comprise:

rates of gas pressure increase at one or more gas meters of the group of gas meters.

18. One or more non-transitory computer-readable media as recited in claim 16, wherein the acts additionally comprise:

increasing a rate of the gas pressure measurements at a gas meter in the group of gas meters responsive to the gas meter measuring a gas pressure over a threshold value.

19. One or more non-transitory computer-readable media as recited in claim 16, wherein the acts additionally comprise:

sending, responsive to the further threshold value being exceeded, a message indicating an over pressure event.

20. One or more non-transitory computer-readable media as recited in claim 16, wherein the acts additionally comprise:

accessing a database comprising topological relationships of the gas meters of the group of gas meters; and changing an entry in the database to indicate that a valve of a gas meter is closed.

\* \* \* \* \*